United States Patent [19]

Capossela et al.

[11] Patent Number: 5,136,619
[45] Date of Patent: Aug. 4, 1992

[54] THERMAL BREEDER FUEL ENRICHMENT ZONING

[75] Inventors: Harry J. Capossela, Schenectady; Joseph R. Dwyer, Albany; Robert G. Luce, Schenectady; Daniel F. McCoy, Latham; Floyd C. Merriman, Rotterdam, all of N.Y.

[73] Assignee: The United States of America as represented by the United States Department of Energy, Washington, D.C.

[21] Appl. No.: 309,638

[22] Filed: Feb. 13, 1989

[51] Int. Cl.$^5$ ............................ G21C 1/06; G21C 7/08
[52] U.S. Cl. ................................ 376/172; 376/173; 376/339; 376/901
[58] Field of Search ............... 376/172, 173, 339, 900, 376/901

[56] References Cited

U.S. PATENT DOCUMENTS

| | | | |
|---|---|---|---|
| 2,852,458 | 9/1958 | Dietrich et al. | 376/339 |
| 2,900,263 | 8/1959 | Handwerk et al. | 376/901 |
| 2,902,423 | 9/1959 | Luebke et al. | 376/901 |
| 2,992,982 | 7/1961 | Avery . | |
| 3,093,563 | 6/1963 | Menke . | |
| 3,122,484 | 2/1964 | Iskenderian . | |
| 3,140,237 | 7/1964 | Peterson et al. | 376/173 |
| 3,141,827 | 10/1962 | Iskenderian . | |
| 3,147,191 | 9/1964 | Crowther | 376/339 |
| 3,297,539 | 1/1967 | Beckurts et al. . | |
| 3,338,790 | 8/1967 | Ackroyd et al. . | |
| 3,341,420 | 9/1967 | Sevy | 376/173 |
| 3,351,532 | 11/1967 | Raab, Jr. et al. | 376/173 |
| 3,658,644 | 4/1972 | Lang | 376/172 |
| 4,481,164 | 11/1984 | Bollinger | 376/339 |
| 4,606,880 | 8/1986 | Penkrot | 376/173 |
| 4,609,521 | 9/1986 | Millot et al. | 376/173 |

FOREIGN PATENT DOCUMENTS

| | | | |
|---|---|---|---|
| 3008472 | 9/1981 | Fed. Rep. of Germany | 376/173 |
| 2011151 | 7/1979 | United Kingdom | 376/173 |

Primary Examiner—Harvey E. Behrend
Attorney, Agent, or Firm—James C. Haight; William R. Moser; Richard E. Constant

[57] ABSTRACT

A method and apparatus for improving the performance of a thermal breeder reactor having regions of higher than average moderator concentration are disclosed. The fuel modules of the reactor core contain at least two different types of fuel elements, a high enrichment fuel element and a low enrichment fuel element. The two types of fuel elements are arranged in the fuel module with the low enrichment fuel elements located between the high moderator regions and the high enrichment fuel elements. Preferably, shim rods made of a fertile material are provided in selective regions for controlling the reactivity of the reactor by movement of the shim rods into and out of the reactor core. The moderation of neutrons adjacent the high enrichment fuel elements is preferably minimized as by reducing the spacing of the high enrichment fuel elements and/or using a moderator having a reduced moderating effect.

8 Claims, 1 Drawing Sheet

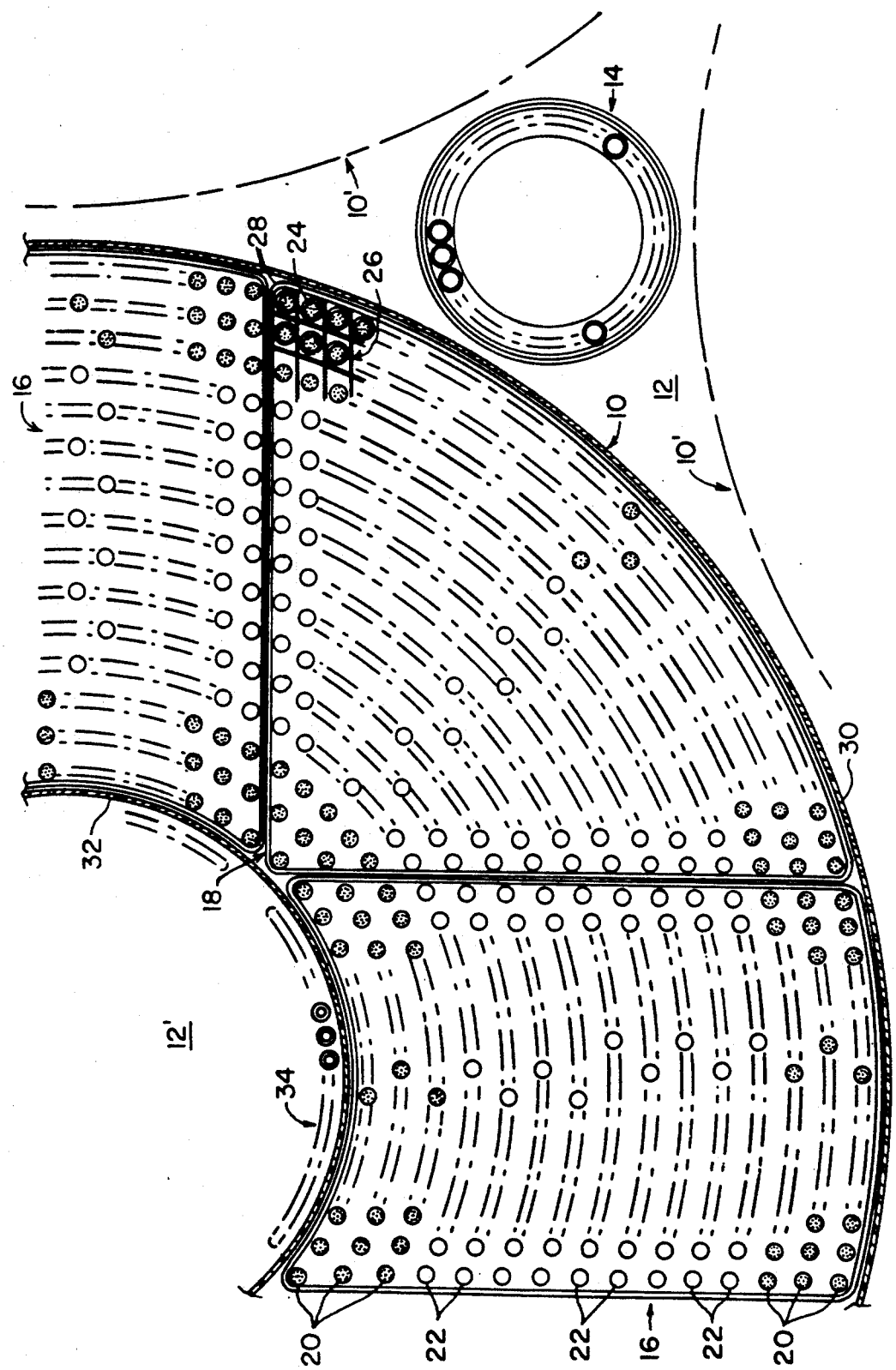

THERMAL BREEDER FUEL ENRICHMENT ZONING

FIELD OF THE INVENTION

The present invention relates generally to thermal breeder reactors, and more particularly to a thermal breeder reactor having a reduced reactivity control requirement.

BACKGROUND OF THE INVENTION

Thermal reactors are designed to operate over a considerable period of time and thus must contain an excess of fissionable material over that amount just necessary to sustain a chain reaction. Such an excess reactivity must be controlled, typically by the use of shim rods or by the inclusion of a burnable poison in the core. However, both of these alternatives have the undesirable result that a considerable number of neutrons are lost by capture in a non-productive absorber. When a thermal reactor is used as a breeder reactor as well, the loss of such neutrons in a non-productive manner additionally affects the ability of the reactor to breed.

In U.S. Pat. No. 3,141,827 (Iskenderian), a breeder reactor design is disclosed which has good neutron economy. This is achieved by the use of depleted fuel elements to obtain shim control in the reactor. The depleted fuel elements absorb neutrons to produce additional fissionable material. The depleted fuel elements are interspersed among slightly enriched elements. In U.S. Pat. No. 3,122,484 (Iskenderian), the use of fuel elements containing a predominant amount of fertile material interspersed with low enrichment fuel elements is disclosed. The fertile fuel elements are covered with a burnable poison. As the enriched fuel is depleted, the fertile material is converted to fissionable material to help compensate for the loss of reactivity in the enriched fuel elements.

In U.S. Pat. No. 3,351,532 (Raab, Jr. et al), a seed-blanket converter-recycle breeder reactor is disclosed in which the fissile and fertile fuel concentrations and their positions within the core are chosen to provide both an extended reactivity lifetime and an increase in fissile fuel inventory. The reactor has a plurality of seed regions or islands in the reactor core surrounded by blanket regions.

A composite reactor which reduces the BOL critical mass of fast systems by using high reactivity thermal regions is disclosed in U.S. Pat. No. 3,093,563 (Menke). The reactor core includes a fast central region where little moderation takes place and a surrounding annular region where greater modulation takes place.

Various designs for fast nuclear reactors have also been disclosed in which zoning of fuel regions have been proposed. For example, in U.S. Pat. No. 3,338,790 (Ackroid et al), a fast reactor is disclosed in which a fast fuel region is surrounded by a blanket area with a coolant zone located therebetween. In U.S. Pat. No. 2,992,982 (Avery), a scheme is disclosed for coupling a small thermal reactor region to a fast reactor to enhance the safety of the fast system without degrading significantly the breeding characteristics of the fast reactor. According to the design disclosed, there is an enriched fuel core surrounded by an inner blanket annulus containing natural uranium and the sodium coolant. Outside of the inner blanket is an annulus of beryllium which in turn is surrounded by an outer blanket of depleted uranium. In U.S. Pat. No. 3,297,539 (Beckurts et al), a fast reactor design is disclosed in which a fast core made of fissile material is surrounded by a blanket made of natural uranium. The natural uranium blanket is in turn surrounded by a reflector made of graphite.

SUMMARY OF THE INVENTION

In accordance with the present invention, a method and apparatus are provided for improving the performance of a thermal breeder reactor which has regions of higher than average moderator concentration. The reactor core includes a plurality of fuel modules in which at least two different types of fuel elements are provided. The two types of fuel elements are a high enrichment fuel element and a low enrichment fuel element. These fuel elements are arranged in the fuel module so that the lower enrichment fuel elements are located between the high moderator regions and the high enrichment fuel elements.

In each fuel module, the fuel elements are preferably arranged in rows. With such an arrangement, there are a plurality of rows of the low enrichment fuel elements located between the high enrichment fuel elements and the adjacent high moderator regions. Shim rods are also preferably located in selected regions to control the reactivity of the reactor by movement of the shim rods into and out of the reactor. A zircaloy element support means is used for supporting the rows of fuel elements in the fuel modules.

In the preferred embodiment, the fuel elements are arranged to minimize the moderation of neutrons adjacent the high enrichment fuel elements. This is accomplished by reducing the spacing of the high enrichment fuel elements in each module relative to the normal spacing in a thermal breeder reactor. Alternatively, or additionally, the minimizing of the moderation is also accomplished by substituting a moderator having a reduced moderating effect for the normal moderator in a thermal breeder reactor.

According to the preferred embodiment, the shim rods include Th-232 and the fuel elements consists essentially of urania and thoria in a zircaloy cladding. At BOL, the high enrichment fuel elements contain about 3%-5% enrichment of U-235 while the low enrichment fuel elements contain about 0%-1% enrichment of U-235. These enrichments are quoted on a total heavy metal basis (fissile+fertile material) as discussed subsequently. The primary diluent is thorium; so that the enrichment of U-235 in the uranium is about 70%-100% prior to dilution in the thorium for both the high and low enrichment fuel elements.

It is an object of the present invention to improve the performance of thermal reactors based on the thorium fuel cycle. In particular, the present invention reduces the reactivity control requirements of a thermal breeder reactor.

It is an advantage of the present invention that the amount of parasitic absorber which must be used in the core for reactivity control is reduced, which thereby improves the breeding.

It is also an advantage of the present invention that the cost of operation of the reactor is reduced because of the reduced cost of reactivity control.

It is a further advantage of the present invention that fission neutrons produced in the high enriched regions diffuse through the low enriched regions and into the moderator regions. These neutrons then slow down in the moderator regions and subsequently diffuse back through the low enriched regions and into the high enriched regions to cause fissions to sustain the neutron chain reaction. Such neutron trajectories reduce the parasitic adsorption in Pa-233 and fission products, improving the breeding and increasing the incore fissile inventory throughout core life.

Other features, objects and advantages of the present invention are stated in or apparent from a detailed description of a presently preferred embodiment of the invention found hereinbelow.

BRIEF DESCRIPTION OF THE DRAWINGS

The single FIGURE is a schematic representation of a portion of a fuel module and adjacent elements found in a thermal breeder reactor according to the present invention.

DETAILED DESCRIPTION OF THE PREFERRED EMBODIMENT

The present invention relates to a thermal breeder reactor based on the thorium fuel cycle. Typical moderators used in such thermal breeder reactors are light and heavy water, graphite, and beryllium. Typical coolants are light and heavy water, helium, and carbon dioxide. For such reactors, a module is an assembly of fuel elements, usually contained in a single structural envelope or can. A typical thermal breeder reactor consists of an ordered array of such modules. A fuel element is the smallest reactor component containing fuel together with additional structural material (e.g. cladding) for mechanical rigidity. Typical fuel elements are rods, ribbons, or plates. The enrichment in a fuel element is the mass of fissile material in the fuel element (i.e. U-233, U-235, Pu-239, and Pu-241) divided by the total mass of fissile and non-fissile fuel in the fuel element. The fuel includes all isotopes of thorium, uranium, and plutonium. Fertile material is all of the material which can be converted into fissile material by neutron absorption and subsequent beta decays, or by neutron absorption alone. Such fertile materials include Th-232, U-232, U-234, Pu-238, and Pu-240. A parasitic absorber is defined as any non-fissile, non-fertile material which absorbs neutrons. Examples of such parasitic absorbers are structural materials, protactinium, and fission products.

With reference to the drawing in which like numerals represent like elements, a fuel module 10 is partially depicted. As shown in phantom, additional fuel modules 10' of similar configuration are located adjacent fuel module 10. A region 12 is located between fuel modules 10 and 10 ' in which there is a higher than average moderator concentration. Another higher than average moderator concentration region 12' is found centrally in fuel module 10. In region 12, a control rod 14 is provided. Typically, control rod 14 is a shutdown and scram rod made of Cd-In-Ag and containing 28 elements as shown.

Fuel module 10 is constructed of alternating cells 16 and 18. Each cell 16 and 18 includes circumferential rows of low enrichment fuel elements 20 and high enrichment fuel elements 22. Fuel elements 20 and 22 include a zircaloy cladding 24. Fuel elements 20 and 22 are maintained in cells 16 and 18 by a suitable zircaloy element support system 26. Both zircaloy cladding 24 and zircaloy element support system 26 are typical of those known in the art, and hence these are only depicted in a selected portion of cell 18 for clarity. Zircaloy element support system 26 includes a cell boundary band 28 as shown.

Fuel module 10 includes an outer zirconium flow boundary 30 and an inner zirconium flow boundary 32. Located adjacent inner flow boundary 32 and opposite cell 16 is a shim control rod 34 consisting of 17 elements as depicted. A shim control rod 34 is located adjacent each cell 16 such that there are four shim control rods 34 located around the circumference of inner flow boundary 32.

Preferably, high enrichment fuel elements 22 are made of a binary solid state solution of urania and thoria. Initially, the urania will be highly enriched, approximately 70%-100% U-235 and preferably 100% versus approximately 3% in conventional fuels. As the fuel is irradiated, it should be appreciated that the fertile Th-232 is converted to fissile U-233. The low enrichment fuel elements 20 consist of thoria pellets in zircaloy tubes with dimensions similar to or somewhat larger than those of high enrichment fuel element 22. The fertile thoria is converted to fissile U-233 during power operation. Initially, low enrichment fuel elements 20 have approximately a 0% enrichment.

The shutdown and power control of the reactor including fuel modules 10 and 10' is provided by control rods 14 which are interstitially located in regions 12. Compensation for lifetime reactivity changes is provided by shim control rods 34 made of thoria. Shim control rods 34 are selectively inserted or withdrawn at discrete intervals of depletion as needed. Since shim control rods 34 do not have any scram function, the design and operation of shim control rods 34 need not be to the same rigorous standards as the design and operation of control rods 14.

In accordance with the present invention, a nuclear reactor fueled with fuel modules 10 provides lower enrichment fuel elements 20 which are placed, relative to higher enrichment fuel elements 22, nearer to regions of higher than average moderator concentration such as regions 12 and 12'. Other regions which should also be similarly configured with fuel modules 10 are other water holes, water reflectors, large graphite regions, and beryllium regions.

The arrangement of fuel elements 20 and 22 described above reduces the reactivity control requirements for the reactor in two ways. One way is by concentrating fissile material production in those areas of the core where a given quantity of fissile material makes a larger than average reactivity contribution. Then, the lifetime reactivity decrease caused by fissile material depletion and fission product build-up is effectively compensated to a much greater degree than could be obtained by merely uniformly distributing the fertile material as in prior art reactor designs. This improvement is obtained because a given quantity of fissile material produced in low enrichment fuel elements 20 contributes more to reactivity than the same quantity of fissile material produced in high enrichment fuel elements 22 due to the fact that low enrichment fuel elements 20 are closest to regions of higher than average moderator concentration. Thus, fast neutrons produced by fission in low enrichment fuel elements 20 have a better chance of reaching the regions of higher than average moderator concentration than fast neutrons produced in high enrichment fuel elements 22, and therefore are better able to slow down and to sustain the nuclear chain reaction. Fissile material production in low enrichment fuel elements 20 also increases relative to the production in high enrichment fuel elements 22. This occurs because thermal neutrons, which have slowed down in the regions of higher than average moderator concentrations, pass through low enrichment fuel elements 20 before reaching high enrichment fuel elements 22. In addition, low enrichment fuel elements 20 generally have lower concentrations of fission products than high enrichment fuel elements 22.

The arrangement of fuel elements 20 and 22 according to the present invention further reduces reactivity control requirements because parasitic absorptions are reduced. This improves breeding and increases the in-core fissile inventory throughout core life. This reduction in parasitic absorptions is achieved because fast neutrons produced by fission in high enrichment fuel elements 22 travel through low enrichment fuel elements 20 and into regions of higher than average moderator concentration. In these regions, the fast neutrons slow down without being attenuated by resonance absorptions in Pa-233, in the fission products, or in other parasitic absorbers in which attenuation would be expected if the fast neutrons slowed down in the moderator closest to high enrichment fuel elements 22. Thermal neutrons then migrate from the regions of higher than average moderator concentration into low enrichment fuel elements 20. In low enrichment fuel elements 20, a portion of these neutrons is absorbed, mostly by fertile material as described above, resulting in improved breeding. The remaining neutrons then migrate into high enrichment fuel elements 22, where they are also absorbed.

In order to more effectively reduce parasitic absorptions, the neutron slowing down rate is preferably minimized in the moderator closest to high enrichment fuel element 22 relative to the neutron slowing down in the regions of higher than average moderator concentration. The neutron slowing down rate in the moderator closest to high enrichment fuel elements 22 can be reduced by minimizing the spacing between high enrichment fuel elements 22. By reducing the spacing, the amount of moderator surrounding each high enrichment fuel element 22 is also reduced. Alternatively, or in addition, moderators can be substituted which require larger moderator volumes than alternative moderators. For example, heavy water or a heavy water and light water mixture could be used instead of light water as the moderator in a water moderated/cooled reactor.

While the present invention has been described with respect to fuel modules 10 having a generally cylindrical shape, it should be appreciated that the zoning of low enrichment fuel elements and high enrichment fuel elements taught by the present invention is applicable to fuel modules of various shapes including square and hexagonal. It should also be appreciated that this zoning taught by the present invention is adaptable to existing commercial pressurized water reactors to achieve a breeding function in such systems as well as in existing designs for light water and heavy water breeder reactors, although light water reactors would tend to be non-conventional because of the very tight fuel element pitch required. In addition, thermal reactors using graphite and beryllium as moderators and helium and carbon dioxide gases as coolants can also make use of the present invention.

Although the present invention has been described with respect to exemplary embodiments thereof, it will be understood by those of ordinary skill in the art that variations and modifications can be effected within the scope and spirit of the invention.

We claim:

1. A thermal breeder reactor based on the thorium fuel cycle, consisting essentially of
   (a) a reactor core including
      (i) a plurality of fuel modules arranged to minimize the moderation of neutrons located adjacent to high enrichment fuel elements contained therein, each said fuel module having a predetermined moderator concentration therein, and
      (ii) a plurality of high moderator regions interspersed with said plurality of fuel modules, each of said moderator regions having a moderator concentration which is higher than said predetermined moderator concentration;
   (b) said fuel modules each including
      (i) a plurality of low enrichment thoria fuel elements initially having approximately 0 % enrichment and
      (ii) a plurality of high enrichment fuel elements in which the urania is initially 70-100% U-235, said low enrichment fuel elements being located in the periphery of said fuel module between said high enrichment fuel elements and an adjacent high moderator region such that fission neutrons produced in the high enrichment fuel element regions diffuse through the low enrichment fuel element regions into the moderator regions, slow down in the moderator regions, then diffuse back through the low enrichment regions and into the high enrichment regions to cause fissions to sustain the neutron chain reaction.

2. A thermal breeder reactor as claimed in claim 1 wherein said fuel elements in each said fuel module are arranged in rows, and wherein these are a plurality of rows of said low enrichment fuel elements located between said high enrichment fuel elements and said adjacent region.

3. A thermal breeder reactor as claimed in claim 2 and further including a zircaloy element support means for supporting said rows of fuel elements in each said fuel module.

4. A thermal breeder reactor as claimed in claim 2 and further including shim control rods made from a fertile material which are located in respective certain selected ones of the regions.

5. A thermal breeder reactor as claimed in claim 4 wherein said shim rod includes Th-232.

6. A thermal breeder reactor as claimed in claim 2 wherein said high enrichment fuel elements consist essentially of urania and thoria in a zircaloy cladding.

7. A thermal breeder reactor as claimed in claim 6 wherein the urania is initially about 70%-100% U-235.

8. A thermal breeder reactor as claimed in claim 6 wherein said low enrichment fuel elements consist essentially of thoria and a zircaloy cladding.

* * * * *